United States Patent [19]

Sund

[11] 4,344,276

[45] Aug. 17, 1982

[54] GRAIN PICKUP

[76] Inventor: Lloyd P. Sund, Newburg, N. Dak. 58762

[21] Appl. No.: 261,982

[22] Filed: May 8, 1981

Related U.S. Application Data

[63] Continuation-in-part of Ser. No. 127,093, Mar. 4, 1980, abandoned.

[51] Int. Cl.³ .............................................. A01D 89/00
[52] U.S. Cl. ........................................ 56/364; 56/400; 198/676
[58] Field of Search .................. 56/364, 400; 198/518, 198/692, 693, 676, 677

[56] References Cited

U.S. PATENT DOCUMENTS

| 1,090,956 | 3/1914 | Zintek | 198/676 |
| 2,480,419 | 8/1949 | Patterson | 198/676 |

FOREIGN PATENT DOCUMENTS

| 54235 | 10/1974 | Australia | 56/364 |
| 1121707 | 7/1968 | United Kingdom | 56/364 |

Primary Examiner—Jay N. Eskovitz
Attorney, Agent, or Firm—Williamson, Bains, Moore & Hansen

[57] ABSTRACT

A grain pickup for use with combines in harvesting windrowed crops is formed of a cylinder with a plurality of cylindrical, interlocking tooth modules located thereon, each of the modules having a plurality of pickup teeth extending radially outwardly therefrom.

3 Claims, 8 Drawing Figures

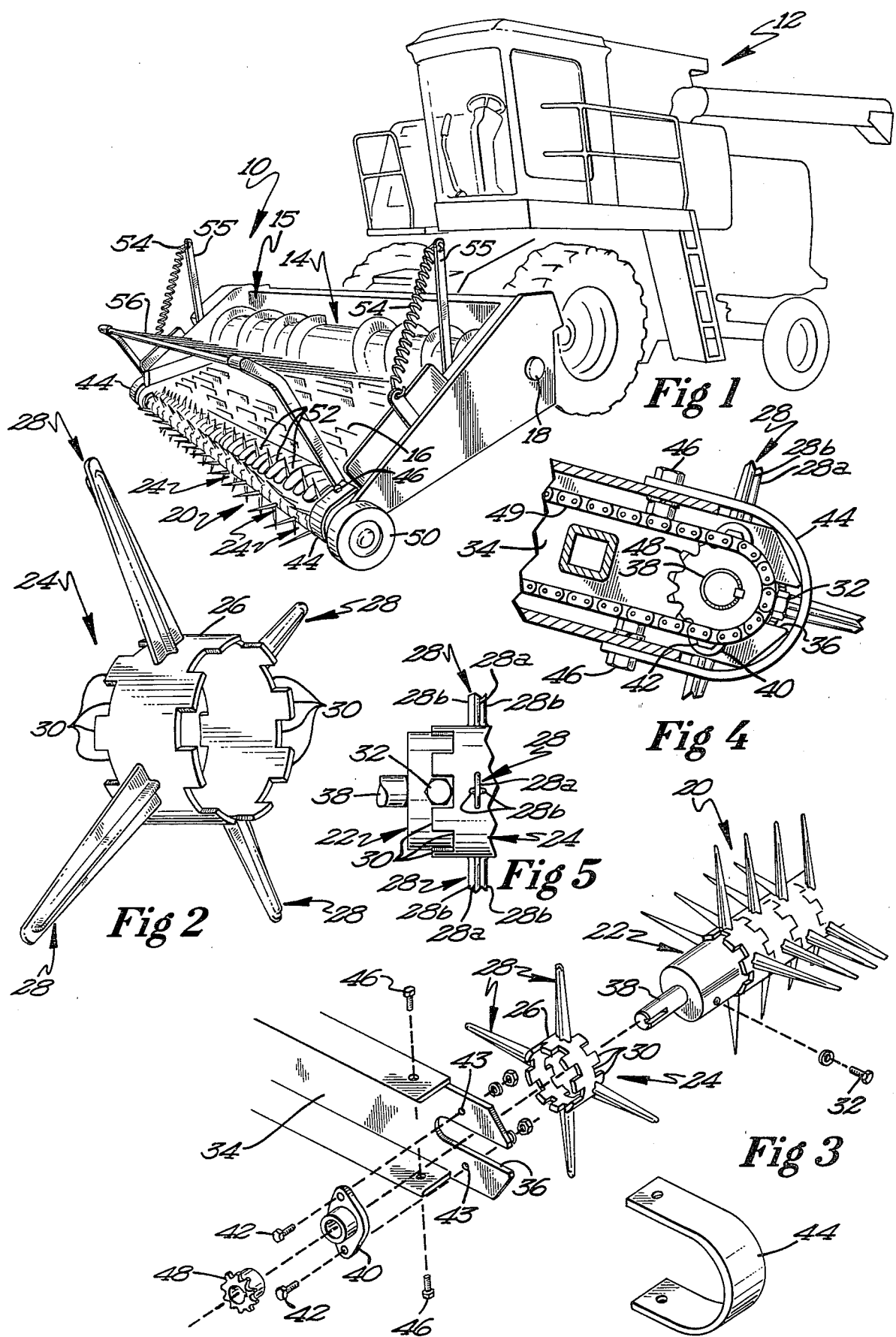

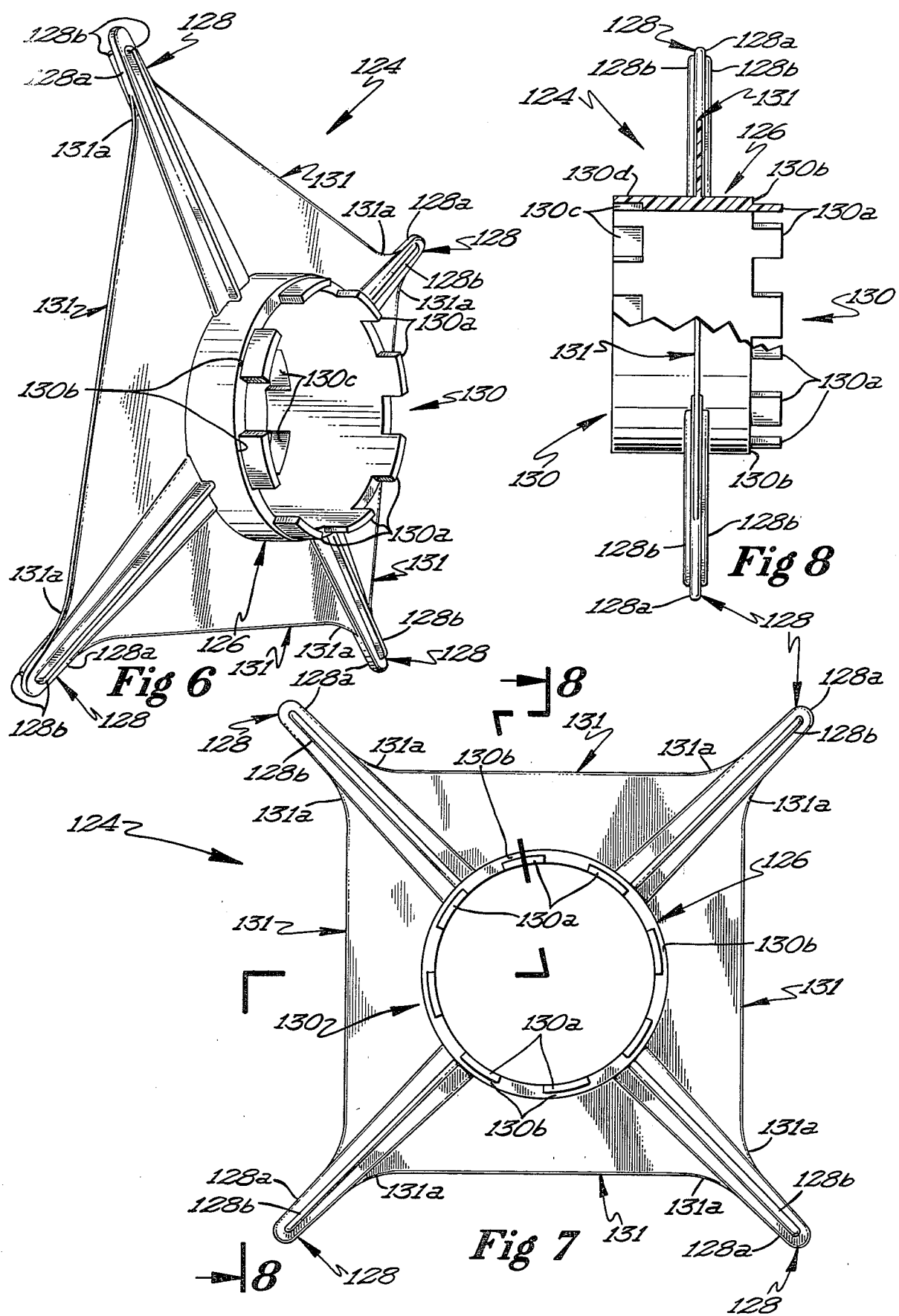

GRAIN PICKUP

RELATED APPLICATIONS

This application is a continuation-in-part of my U.S. patent application Ser. No. 127,093, filed Mar. 4, 1980 now abandoned.

BACKGROUND OF THE INVENTION

Grain pickups have been used for many years to assist in the harvesting of various small grains such as pinto beans, soy beans, peas, maize and corn. Generally, a grain pickup is attached to the front of a combine which picks up a swath of grain which has been cut earlier. The pickup serves to pick up the swath and feed it into the combine for processing therein. Various types of grain pickups are well known. The raking-type pickups shown in U.S. Pat. Nos. 3,233,394; 2,713,762 and 2,795,100 are typical of raking-type pickups. Drum-type pickups are also well known wherein a plurality of metal or plastic tines are each individually fastened to a cylinder. While the drum-type pickups have generally proven to be operable at higher speeds, the prior art drum pickups have not always proven satisfactory.

It is therefore an object of the instant invention to provide a drum-type pickup which is capable of harvesting grains at relatively high speeds and yet which can be manufactured and serviced easily and quickly.

SUMMARY OF THE INVENTION

A driven rotating cylinder is provided at the front of the pickup. A plurality of tooth modules are provided. Each tooth module is comprised of a cylindrical portion having castellated end surfaces and a plurality of pickup teeth depending radially outwardly from the cylindrical section. A relatively thin web extends outwardly from the cylindrical section in the plane of the teeth and series to prevent wrapping and tangling. The pickup tooth module is generally a one-piece unit molded of plastic. The castellated portions of adjacent modules interlock with one another and a plurality of these modules are slid over the driven cylinder. Then, each end module is locked relative to the cylinder and, due to the castellations on the various modules, rotation of all the modules relative to one another and the cylinder is prevented. A flexible finned rubber draper is provided to convey the grain from the pickup teeth to the auger of the combine. A number of comb-like stripper teeth overlay the top of the cylinder so that the teeth pass between the stripper teeth and serve to cause the grain to pass thereover onto the draper.

These and other objects of my invention will become readily apparent as the following description is read in conjunction with the accompanying drawings wherein like reference numerals are used to refer to the several views.

BRIEF DESCRIPTION OF THE DRAWINGS

FIG. 1 is a perspective view showing the invention mounted on a combine.

FIG. 2 is a perspective view of the tooth module.

FIG. 3 is an exploded perspective view showing the mounting of the modules and the cylinder.

FIG. 4 is an end view showing again the mounting of the cylinder.

FIG. 5 is a plan view showing the mounting and fixing of the teeth module relative to the cylinder.

FIG. 6 is a perspective view of a modification of the tooth module.

FIG. 7 is an end plan view of the tooth module.

FIG. 8 is a sectional view taken along line 8—8 of FIG. 7.

DESCRIPTION OF THE PREFERRED EMBODIMENT

The grain pickup 10 of the instant invention is attached to a conventional combine 12 having an auger 14 located in the header 15 thereof. Pickup 10 has a flexible finned rubber draper 16 located thereon which serves to convey grain from the pickup teeth assembly 20 to auger 14. Draper 16 is conventional and well known and thus is not shown in detail. A cylinder assembly 20 is mounted in the front end of pickup 10 and is comprised of a flat, smooth cylinder 22 having a plurality of tooth modules 24 located thereon.

Each tooth module 24 is comprised of a cylindrical portion 26 having castellations 30 located on either end thereof. A plurality of teeth 28 extend generally radially outwardly from cylindrical portion 26. Teeth 28 are preferably four in number for each tooth module 24 and the tooth module 24 is integrally formed of a plastic material which is strong yet flexible to a certain extent. The tooth module 24 may be manufactured of a polyester elastomer such as Hytrel manufactured by Dupont. Of course, other suitable materials may be utilized for this purpose. The particular shape of teeth 28 is shown in FIGS. 2 and 5, and each tooth 28 consists of a main circumferentially directed portion 28a and cross ribs 28b which run axially relative to cylindrical portion 26.

The improved tooth module 124, shown in FIGS. 6–8, is designed to prevent wrapping of weeds and the like about the cylinder 22 of the device. Imporved module 124 is comprised of a cylindrical portion 126 having a plurality of pickup teeth 128 extending radially outwardly therefrom. Teeth 128 are preferably four in number and comprise main component 128a which lies in a circumferential plane and cross ribs 128b which lie parallel to the axis of the module 124. Castellations 130 are provided on either end of cylindrical portion 126. The male portions 130a of castellations 130 are shown most particularly on the right side of FIG. 8 and have a slight recess 130b around the outer circumference thereof to accommodate and be restrained by ridge 130d which overlies slots 130c for receiving the male portions 130a of castellations 130.

In particular, the provision of a web 131 lying in essentially the same plane as pickup teeth 128 works to prevent the tangling of weeds and the like about the cylinder 22. Preferably, webs 131 extend a substantial distance outwardly from cylindrical portion 126 but do not extend all the way to the end of teeth 128. If desired, webs 131 may be provided with radiuses 131a at the point of transition between web 131 and tooth 128.

As can be seen particularly in FIGS. 3 and 5, tooth modules 24 form a relatively snug fir on cylinder 22 and the castellations in respective modules interlock with one another to prevent rotation of one module relative to another. As can be seen in FIG. 5, a bolt 32 is threaded into cylinder 22 between castellations 30 on one end of cylinder 22 and on the other end (not shown) to prevent rotation of the tooth modules 24 relative to cylinder 22.

Cylinder assembly 20 is mounted in frames 34 of pickup 10. As can be seen particularly in FIGS. 3 and 4, a slot 36 is formed in the end of end member 34 allowing the cylinder 22 to be slid in and out. In particular, shaft 38 located on the end of cylinder 22 passes through slot 36 and bearing 40 which attaches to end frame 34 by means of bolts 42 and holes 43. Holes 43 may be slotted if desired for adjustment purposes. A guard 44 is attached to end frame 34 by means of fasteners 46 and a sprocket 48 is attached to shaft 38 to drive cylinder assembly 20. Sprocket 48 is driven by means of chain 49 which is driven by the conventional portions of the pickup mechanism 10. Wheels 50 are rotatably attached to end frame 34 behind slot 36. This location allows the position of the pickup teeth 28 relative to the ground to be raised or lowered merely by raising or lowering the header 15 on combine 12, the header adjustment being a normal adjustable function on a combine. End frames 34 are attached at the rearward end at pivot point 38 to header 15. The details of this attachment are generally conventional and as such are not shown.

The weight of pickup assembly 10 is partially suspended from the combine by means of support member 55 attached to header 15. A spring 54 connects support member 55 to end frame 34 thus allowing the pickup to float over rough or uneven ground. A wind guard 56 consisting of a number of rearward facing tines is attached to help guide the grain into the auger. Such wind guards are conventional.

A plurality of stripper teeth 52 extend forwardly from the frame of pickup 10 as can be seen in FIG. 1. Such teeth are generally conventional and may be formed of metal or plastic.

The construction shown allows pickup teeth to be quickly and easily replaced in the event of the inevitable breakage. For replacement, if the modules 24 are molded of plastic, the damaged module 24 may be cut and removed from the cylinder. The remaining modules may then be slid across leaving only an open position at one end of cylinder 22. Fasteners 43 are then loosened and cylinder 22 slid partially out of the front of the machine. A new module 24 is then placed on the end of cylinder 22 and locked in place. Finally, the cylinder is repositioned. This ease of repair resulting from the instant invention allows repairs to be made in the field.

Also, the modular construction allows for extreme simplicity in manufacture.

While the preferred embodiments of the present invention have been described, it should be understood that various changes, adaptations and modifications may be made therein without departing from the spirit of the invention and the scope of the appended claims.

What is claimed is:

1. In a grain pickup for picking up windrowed grain for conveyance into a combine, the improvement comprising:
   a driven rotating cylinder located transversely at the front of said pickup;
   a plurality of plastic pickup teeth modules mounted on said cylinder, each of said modules comprising:
   a cylindrical portion having two ends and a bore sized to snugly fit over said cylinder;
   a plurality of integrally molded pickup teeth projecting radially outwardly from said cylindrical portion with said cylindrical portion having a thickness relatively thin compared to the diameter of said driven of said driven cylinder, each of said cylindrical portion ends having interlocking castellations thereon; and
   a plurality of integrally molded web portions extending radially outward from said cylindrical portion between said pickup teeth and in the plane thereof said web portions being thinner than said teeth and terminating radially inwardly of the outward ends of said teeth; and
   means for preventing movement of said modules relative to said cylinder.

2. The grain pickup of claim 1 wherein said pickup has at least two end frames having longitudinally extending slots in the front ends thereof, said slots being open at the front end thereof, said cylinder being rotatably mounted in said slots.

3. The grain pickup of claim 1 wherein said means for preventing movement of said modules relative to said cylinder comprises means for engaging said castellations on at least one of said modules, said engaging means threaded into said rotating cylinder.

* * * * *